April 27, 1926.
W. H. VOGEL
PACKING
Filed April 2, 1924
1,582,562
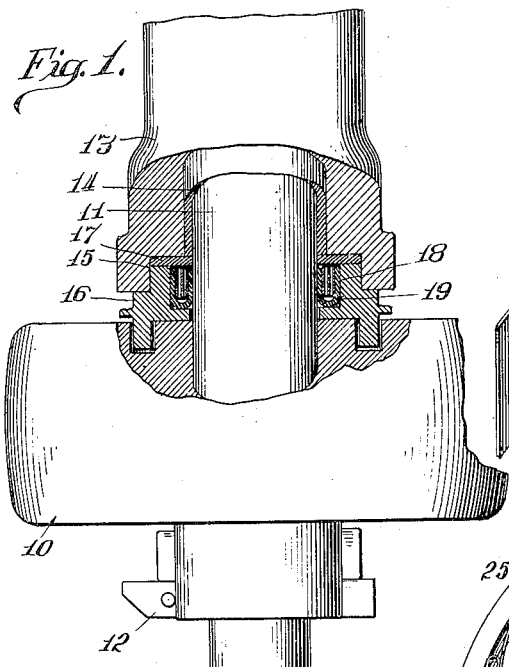
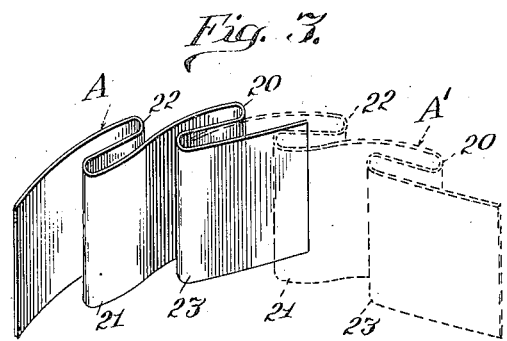
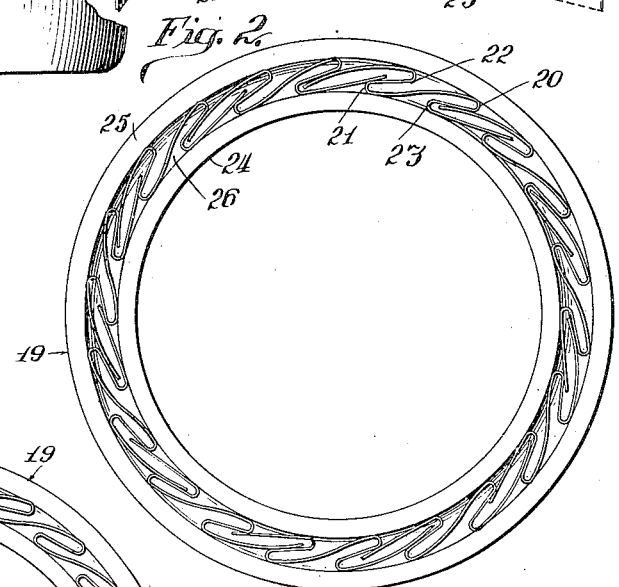
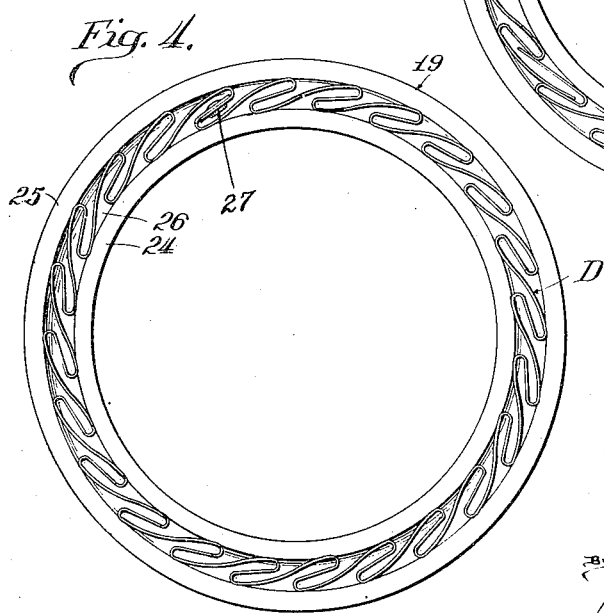
Inventor.
William H. Vogel
By Barnett Sillman
Attorneys Patented Apr. 27, 1926.

1,582,562

UNITED STATES PATENT OFFICE.

WILLIAM H. VOGEL, OF HIGHLAND PARK, ILLINOIS, ASSIGNOR TO RAYMOND BROS. IMPACT PULVERIZER CO., OF CHICAGO, ILLINOIS, A CORPORATION OF ILLINOIS.

PACKING.

Application filed April 2, 1924. Serial No. 703,643.

*To all whom it may concern:*

Be it known that I, WILLIAM H. VOGEL, a citizen of the United States, residing at Highland Park, in the county of Lake and State of Illinois, have invented certain new and useful Improvements in Packing, of which the following is a specification.

My invention relates to a packing for a rotating or reciprocating shaft or other analogous machine element; and the principal object of the invention is to provide a packing suitable particularly for the journal of a pulverizing mill roller assembly, although it is realized that the packing herein shown and described might be used advantageously in other situations where similar conditions exist.

In a pulverizing mill of the Raymond type the material is pulverized through the action of a series of pendant rollers which revolve on their axes and travel around the inner surface of a "bull ring" against which the rollers are pressed by the centrifugal force developed by the rapid rotary movement of the spider from which the roller housings, wherein the roller journals turn, are hung. The bearings between the journals and housings are lubricated and a packing is necessary at the bottom of the housing in order to prevent waste of lubricant through gravity and centrifugal force; although it is not intended to altogether stop the outflow of the lubricant, since a continuously moving film of the lubricant is usually regarded as the best preventive of the entrance of dust and dirt into the bearing from the dust laden air of the mill. In a bearing of this type some side play is inevitable due to the wear of the parts and the continuous outward stresses of the rollers against the bull ring. The roller journals may even bend to a slight extent under the forces developed.

Having the requirements of this situation in mind, my invention has been directed toward providing a packing which will effectively prevent waste of lubricant and which will be very durable, particularly as against the crushing forces due to lateral play of the shaft in the housing tending to destroy the packing or impair its efficiency.

The invention is illustrated, in certain preferred embodiments, in the accompanying drawing wherein—

Fig. 1 is a fragmentary side elevation, with parts in section, of the lower end of a roller bearing assembly, for a mill of the type indicated, provided with a packing constructed in accordance with the invention.

Fig. 2 is a plan view of the packing showing the roller journal and associated parts in section, the scale being considerably larger than the scale of Fig. 1.

Fig. 3 is a detail view, in perspective, on a still larger scale, of a part of the expanding structure for forcing the flexible packing member against the shaft, and Fig. 4 is a view, similar to Fig. 2, illustrating a modification.

Referring first to Figs. 1, 2 and 3: 10 designates the roller and 11 a journal to the end of which the roller is fixed, for example, by means of wedge 12. 13 is a housing in which the journal turns, the housing being preferably provided with a bushing 14. The lower end of the housing is formed with a recess 15 in which is located a sealing ring 16. The sealing ring is secured to the housing by any suitable means (not shown) against a gasket 17. No claim is made herein to the construction of the parts thus far described.

The sealing ring 16 is formed so that an annular space 18 exists between it and the journal 11, and in this space is arranged a packing member 19 of somewhat flexible material such as leather. Preferably the packing member is an endless structure, channel-shaped in cross section and comprising concentric inner and outer side walls, the inner wall having a more or less close fit with the journal 11. A film of lubricant moves downwardly, by gravity and through the operation of centrifugal force, between the inner surface of bushing 14 and the surface of the journal, and it is the function of the channeled or U-shaped packing member 19 to prevent the escape of this lubricant, or at least the escape of the same in undesirably large quantities. While in the drawing the journal is shown as having a close fit with the bushing, a certain amount of looseness is certain to develop between these parts for the reasons above stated. This looseness involves, ordinarily, the compression of the portion of the packing member at the point most remote from the bull ring together with a possible gap between the packing member and the shaft at the point nearest the bull ring. Variation in the distribution and character of the material operated upon may bring about a chattering or lateral vibration as between the housing and journal which affects the packing. My invention is concerned with the provision of expanding means within the channel of the packing member which, in the first place, will hold the packing with a gentle pressure against the journal adjusting itself with a quick response to any lateral vibrations between journal and housing so as to prevent waste of the lubricant; and, in the second place, will be of such character as to endure and retain its efficiency as against the crushing or vibratory forces developed by the thrust of the roller against the bull ring and the material between the roller and the ring.

In the preferred form of the invention the expanding means consists of one or more strips of sheet metal bent into the form of a series of spring loops, which loops are compressed when the structure is inserted into the channel of the packing member so that they are adapted to expand radially of the shaft and exert pressures against the opposite side walls of said member. In Figs. 2 and 3 I have shown the expanding structure as made up of several such strips of metal with adjacent end loops interlocked, while in Fig. 4 I have shown the expanding structure as consisting of a single strip of metal. The term "structure" used in this connection is not intended to imply mechanical integrity. It signifies functional unity. The structure might be made up of any number of separate parts arranged either with an interengaging relationship, as shown in Figs. 2 and 3, or juxta-posed merely so that they act in unison to expand the packing member against the shaft, when necessary to take up looseness, or to yield against a compression thrust as between the shaft and its housing. By the term "shaft" I intend to include any analogous machine element.

In Fig. 3 I have shown two looped expanding strips A, A'. Each strip is bent on lines transverse with respect to the strip, that is, on lines parallel to the axis of the journal 11, so as to form four loops 20, 21, 22 and 23. These loops have their openings alternately on opposite sides of the strip. That is, when the expanding strip is assembled in the packing member one loop opens toward the inner wall 24 of the packing member, while the next opens toward the outer wall 25 of the packing member, and so on. This means that the strip is bent in a series of approximately S curves. The loops, however, are preferably longer than their widths and are designed to lie diagonally in the channel 26 of the packing member with both legs of each loop extending substantially circumferentially of the shaft, the loops bearing alternately against the inner and outer walls of the packing member at points which are diagonal to each other relative to any given radius of the packing. The end loop 22 of one strip is interlocked with the end loop 23 of the other strip. The arrangement of the loops is such that one reinforces the other.

In Fig. 4 the same arrangement is shown except that the expanding means consists of a single sheet metal strip D, the ends of which are secured together by a rivet 27.

It will be noted that each adjacent pair of oppositely directed loops have one leg in common. The flat transverse surface of the spring strip at any point is parallel to the axis of the shaft, so that where the loops bear against the side walls of the channel member, the flat surface of the spring strip is parallel to and bears evenly against this side wall.

While the packing member 19 may be fairly stiff before it is applied to the shaft, contact with the lubricant tends to make it quite soft. The expanding structure of my invention bears against the opposite legs of the packing member at places relatively close together. The metal strip or strips may be almost as wide as the depth of the channel so that the device is very effective for keeping the packing member closely and firmly against the shaft even when much softened by the lubricant. The crushing stresses against the expanding structure are so distributed as to insure durability. The spring strips are held in place in the channel by compression but even if they should work up no particular harm is done since the distance between the upper edges of the strips and the gasket 17 is small.

Realizing that the invention, in the embodiment shown, is susceptible of other modifications without departure from the principle of the invention, it is my intention to cover all such modifications as come within the scope of the appended claims.

I claim:

1. A packing for a shaft or analogous machine element comprising in combination, an annular flexible channeled packing member including concentric inner and outer side walls, the inner wall adapted to bear against the shaft, and a spring member formed of a flat band of metal confined in the channeled member, and reversely looped so that its flat faces alternately engage the inner and outer walls of the channeled member, whereby the spring loops expand substantially parallel with one another and radially of the shaft to force the side walls of the channeled member apart.

2. A packing for a shaft or analogous machine element comprising in combination, an annular flexible channeled packing member including concentric inner and outer side walls, the inner wall adapted to bear against the shaft, and an annular spring structure confined between the side walls and comprising a series of alternately oppositely-directed, connected, loops, all extending circumferentially of the shaft, and adapted to expand radially of the shaft.

3. A packing for a shaft or analogous machine element comprising in combination, an annular flexible channeled packing member including concentric inner and outer side walls, the inner wall adapted to bear against the shaft, and an annular spring structure confined between the side walls and comprising a series of alternately oppositely-directed, overlapping loops, each overlapping pair of loops having one leg in common, and all of the legs extending substantially circumferentially of the shaft.

4. A packing for a shaft or analogous machine element comprising in combination, an annular flexible channeled packing member including concentric inner and outer side walls, the inner wall adapted to bear against the shaft, and an annular spring structure confined between the side walls and comprising a series of loops, each loop formed of a pair of substantially parallel legs connected at one end, the legs both extending substantially circumferentially of the shaft, and the loops adapted to expand radially of the shaft.

5. A packing for a shaft or analogous machine element comprising in combination, an annular flexible channeled packing member including concentric inner and outer side walls, the inner wall adapted to bear against the shaft, and an annular spring structure confined between the side walls and comprising a series of loops, each loop formed of a pair of substantially parallel legs connected at one end, the legs both extending substantially circumferentially of the shaft, and the loops adapted to expand radially of the shaft, each adjacent pair of loops opening respectively in opposite directions and having one leg in common.

6. A packing for a shaft or analogous machine element comprising, in combination, an annular flexible packing member having spaced side walls, and a spring structure confined between the side walls and comprising a series of loops, each loop formed of a pair of substantially parallel legs connected at one end, both legs extending substantially circumferentially of the shaft, each adjacent pair of loops opening respectively in opposite directions and having one leg in common.

7. A packing for a shaft or analogous machine element comprising, in combination, an annular flexible channeled packing member including concentric inner and outer side walls, the inner wall adapted to bear against the shaft, and a spring structure confined between the side walls and consisting of a longitudinally looped strip of flat spring metal, the transverse flat surface of the strip being everywhere parallel to the axis of the shaft, and adjacent the bowed portions of the loops being parallel to the side walls of the channeled packing member and bearing thereagainst.

8. A packing for a shaft or analogous machine element comprising, in combination, an annular flexible channeled packing member including concentric inner and outer side walls, the inner wall adapted to bear against the shaft, and a spring construction confined between the side walls and consisting of a series of loops extending circumferentially of the shaft, each loop formed of a strip of flat spring metal, the transverse flat surface of the strip being everywhere parallel to the axis of the shaft, and adjacent the bowed portions of the loops being parallel to the side walls of the channeled packing member and bearing thereagainst.

WILLIAM H. VOGEL.